(12) United States Patent
Okajima

(10) Patent No.: US 11,769,339 B2
(45) Date of Patent: Sep. 26, 2023

(54) COMPUTER-READABLE RECORDING MEDIUM STORING TRAINING DATA GENERATION PROGRAM, TRAINING DATA GENERATION METHOD, AND TRAINING DATA GENERATION APPARATUS

(71) Applicant: FUJITSU LIMITED, Kawasaki (JP)

(72) Inventor: Seiji Okajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/585,092

(22) Filed: Jan. 26, 2022

(65) Prior Publication Data
US 2022/0309814 A1 Sep. 29, 2022

(30) Foreign Application Priority Data
Mar. 26, 2021 (JP) .................. 2021-053842

(51) Int. Cl.
  *G06V 30/19* (2022.01)
  *G06F 16/35* (2019.01)
(52) U.S. Cl.
  CPC .. *G06V 30/19147* (2022.01); *G06V 30/19093* (2022.01); *G06V 30/19107* (2022.01); *G06F 16/35* (2019.01)
(58) Field of Classification Search
  CPC ....... G06V 30/19147; G06V 30/19093; G06V 30/19107; G06F 16/35
  See application file for complete search history.

(56) References Cited

U.S. PATENT DOCUMENTS

| | | | |
|---|---|---|---|
| 2007/0162411 A1* | 7/2007 | Kupershmidt | G06N 5/02 706/60 |
| 2014/0344274 A1* | 11/2014 | Kido | G16H 70/60 707/737 |
| 2016/0253392 A1* | 9/2016 | Allen | G06F 16/93 707/740 |

(Continued)

FOREIGN PATENT DOCUMENTS

| | | |
|---|---|---|
| CN | 103218368 A * | 7/2013 |
| JP | 2009-520278 A | 5/2009 |

(Continued)

OTHER PUBLICATIONS

Ilke Sipahi et al., "Angiotensin-receptor Blockade and Risk of Cancer: Meta-analysis of Randomised Controlled Trials", www.thelancet.com/oncology, Lancet Oncol 2010; vol. 11, pp. 627-636, DOI: 10.1016/S1470-2045(10)70106-6, Jun. 14, 2010 (Total 10 pages).

*Primary Examiner* — Amandeep Saini
*Assistant Examiner* — Daniella M. DiGuglielmo
(74) *Attorney, Agent, or Firm* — Fujitsu Patent Center

(57) ABSTRACT

A non-transitory computer-readable recording medium storing a training data generation program for causing a computer to execute processing including: identifying, from among meta-analysis literatures stored in a memory, a plurality of meta-analysis literatures in which a first literature is cited; determining a degree of similarity between the plurality of identified meta-analysis literatures based on feature information of the plurality of identified meta-analysis literatures; and in response to the degree of similarity being equal to or higher than a threshold, generating training data for machine learning including the first literature.

5 Claims, 14 Drawing Sheets

(56) References Cited

U.S. PATENT DOCUMENTS

| | | | | |
|---|---|---|---|---|
| 2018/0373754 A1* | 12/2018 | Xu | ........................ | G06F 16/242 |
| 2021/0065041 A1* | 3/2021 | Gopalan | ................ | G06F 16/353 |
| 2021/0342377 A1* | 11/2021 | Galle | ..................... | G06N 3/045 |
| 2022/0019741 A1* | 1/2022 | Roy | ........................ | G06N 3/044 |

FOREIGN PATENT DOCUMENTS

| | | |
|---|---|---|
| JP | 2017-173953 A | 9/2017 |
| WO | 2007/075488 A2 | 7/2007 |

\* cited by examiner

COMPUTER-READABLE RECORDING MEDIUM STORING TRAINING DATA GENERATION PROGRAM, TRAINING DATA GENERATION METHOD, AND TRAINING DATA GENERATION APPARATUS

CROSS-REFERENCE TO RELATED APPLICATION

This application is based upon and claims the benefit of priority of the prior Japanese Patent Application No. 2021-53842, filed on Mar. 26, 2021, the entire contents of which are incorporated herein by reference.

FIELD

The embodiments discussed herein are related to a technique for generating training data.

BACKGROUND

In the medical field, meta-analysis is known in which pieces of data on a plurality of past clinical studies are integrated by using a statistical method to perform analysis.

Meta-analysis is very important for practicing evidence-based medicine. To perform meta-analysis, narrowing-down of literatures to be analyzed is performed by spending many man-hours.

Description is given below of a process in which a method in the related art is used to narrow down literatures to be targets of meta-analysis. The following example describes steps of narrowing down literatures to be targets of meta-analysis (meta-analysis target literatures) among a plurality of literatures related to analysis of cancer risk of angiotensin-receptor blockade (ARB).

[Step 1] Search for randomized controlled trial (RCT) papers related to ARB is performed. For example, OR search for generic names of ARB (losartan, valsartan, candesartan, irbesartan, eprosartan, telmisartan, and olmesartan) is performed. In this case, randomized controlled trial, human, and English are used as filters.

A search result of 2057 literatures is obtained by the search in step 1.

[Step 2] Manual narrowing down is performed under the following conditions (i) to (v).

Condition (i) Experiments whose periods are less than 12 months are excluded.
Condition (ii) Experiments in which the number of patients is less than 100 are excluded.
Condition (iii) Literatures not including "cancer", "carcinoma", "malignancy", "neoplasm", "neoplasia", or "tumor" are excluded.
Condition (iv) Experiments in which all groups received ARB are excluded.
Condition (v) Meta-analysis is excluded. By the narrowing-down of step 2, 60 literatures are left.

[Step 3]
A researcher or the like actually reads the contents of the 60 literatures obtained by the narrowing-down in step 2, and narrows down the literatures to be the targets of meta-analysis to literatures in which occurrence of cancer is reported and literatures in which death due to cancer is reported. The literatures to be the targets of meta-analysis are thereby narrowed down to five literatures.

However, such a narrowing-down method of the meta-analysis target literatures in the related art is complicated and takes time.

Accordingly, solving the narrowing down of the meta-analysis target literatures as a literature classification problem by machine learning is conceivable. To build a machine learning model (classification model) for solving such a literature classification problem, literatures actually cited in meta-analysis literatures are used as training data. It is desirable to collect a set of literatures that are actually used as targets of the meta-analysis. The meta-analysis literatures may be easily determined by search or the like.

Examples of the related art include as follows: Japanese Laid-open Patent Publication No. 2017-173953, Japanese National Publication of International Patent Application No. 2009-520278, and Specification of U.S. Patent Application Publication No. 2018/0373754.

SUMMARY

According to an aspect of the embodiments, there is provided a non-transitory computer-readable recording medium storing a training data generation program for causing a computer to execute processing including: identifying, from among meta-analysis literatures stored in a memory, a plurality of meta-analysis literatures in which a first literature is cited; determining a degree of similarity between the plurality of identified meta-analysis literatures based on feature information of the plurality of identified meta-analysis literatures; and in response to the degree of similarity being equal to or higher than a threshold, generating training data for machine learning including the first literature.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
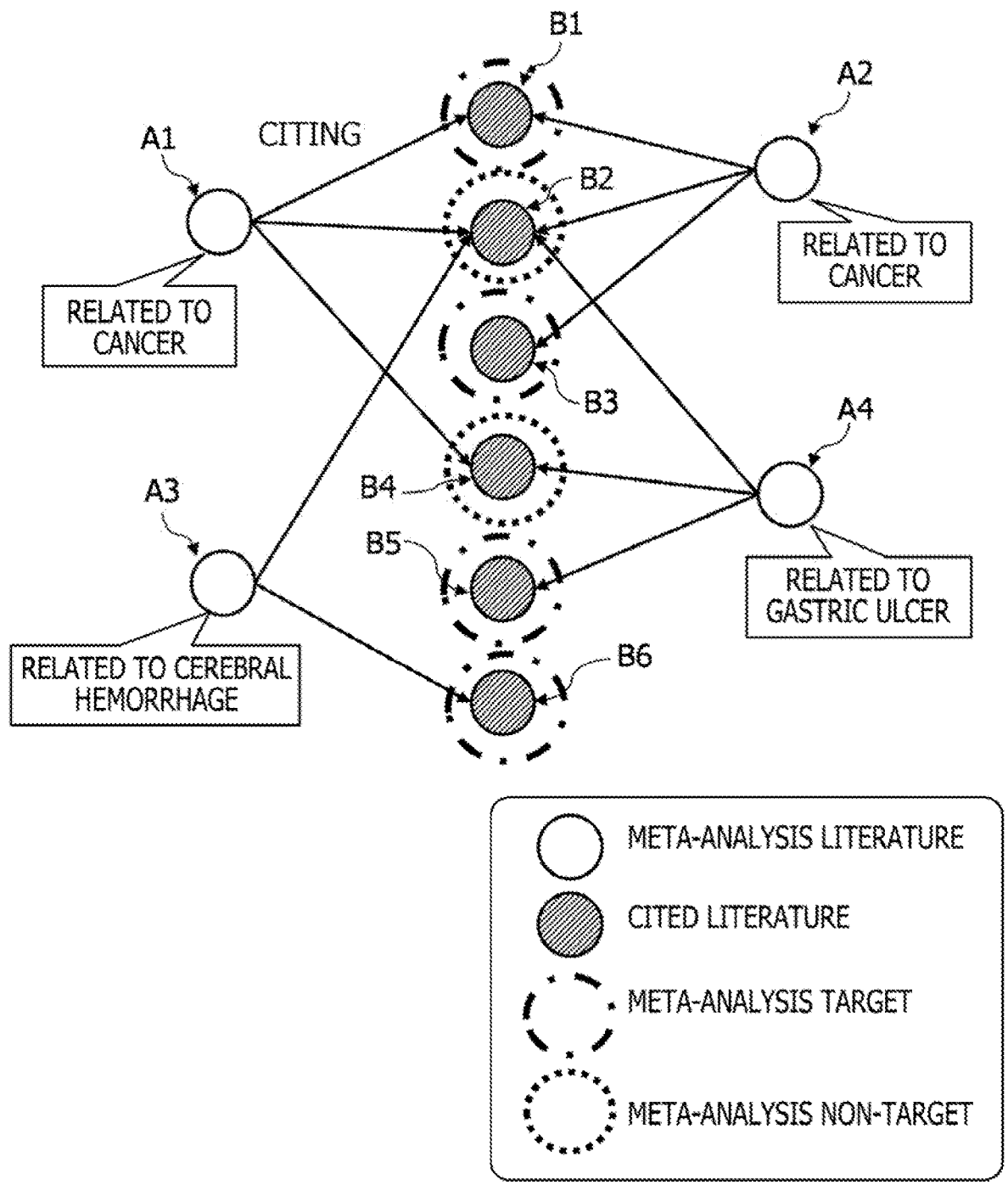
FIG. 1 explains a concept of a method of identifying meta-analysis target literatures in information processing apparatuses in first and second embodiments.

However, literatures cited in the meta-analysis literatures also include literatures that are not cited as targets of the meta-analysis. For example, literatures cited to describe experimental techniques and known facts correspond to these literatures. Including literatures other than the meta-analysis target literatures in the training data may reduce the accuracy of the machine learning model. As illustrated in steps 1 to 3 described above, it is complicated to identify the meta-analysis target literatures among the literatures cited in the meta-analysis literatures.

According to one aspect, an object of the present disclosure is to easily generate training data of a machine learning model for identifying a meta-analysis target literature.

Embodiments of a training data generation program, a training data generation method, and a training data generation apparatus are described below with reference to the drawings. The following embodiments are merely examples and there is no intention of excluding application of various modification examples or techniques that are not explicitly described in the embodiments. For example, the embodiments may be carried out while being modified in various ways (for example, combining the embodiments and the modification examples) without departing from the gist of the present embodiments. The drawings are not provided with an intention that the illustrated configurations include only the components illustrated in the drawings, and the configurations may include other functions and the like.

(I) Basic Principle

FIG. 1 explains a basic concept of a method of identifying meta-analysis target literatures in information processing apparatuses 1a and 1b (see FIGS. 2 and 8) in first and second embodiments to be described later.

FIG. 1 illustrates a plurality (four in the example illustrated in FIG. 1) of meta-analysis literatures A1 to A4 and a plurality (six in the example illustrated in FIG. 1) of literatures B1 to B6 cited in these meta-analysis literatures A1 to A4. The literatures B1 to B6 correspond to first literatures cited in the meta-analysis literatures A1 to A4. Hereinafter, a literature cited in a meta-analysis literature may be referred to as a cited literature. In the example illustrated in FIG. 1, the literatures B1 to B6 are the cited literatures, respectively. A literature in which the literature (cited literature) is cited may be referred to as a literature including a citation or a citing literature. For example, in the example illustrated in FIG. 1, the meta-analysis literature A3 in which the cited literatures B2 and B6 are cited corresponds to the citing literatures of the cited literatures B2 and B6.

In the example illustrated in FIG. 1, the meta-analysis literatures A1 and A2 are both meta-analysis literatures having a theme related to cancer, and the cited literatures B1, B2, and B4 are cited in the meta-analysis literature A1 while the cited literatures B1 to B3 are cited in the meta-analysis literature A2.

The meta-analysis literature A3 is a meta-analysis literature having a theme related to cerebral hemorrhage, and the cited literatures B2 and B6 are cited in the meta-analysis literature A3. The meta-analysis literature A4 is a meta-analysis literature having a theme related to gastric ulcer, and the cited literatures B2, B4, and B5 are cited in the meta-analysis literature A4.

The meta-analysis target literature is generally cited in meta-analysis literatures having a theme related to a specific drug or a side effect.

For example, in the example illustrated in FIG. 1, the cited literature B1 is cited only in the meta-analysis literatures A1 and A2 having a theme related to cancer, and is thus assumed to be the meta-analysis target literature. Similarly, the cited literatures B3, B5, and B6 are each cited in one meta-analysis literature, and are thus all assumed to be the meta-analysis target literatures.

Meanwhile, when the themes of the citing literatures vary widely, it may be assumed that the cited literature is cited for description of an experimental technique or a known fact and is not cited as the meta-analysis target literature.

In the example illustrated in FIG. 1, the cited literature B2 is cited in the meta-analysis literatures A1 and A2 having a theme related to cancer, the meta-analysis literature A3 having a theme related to cerebral hemorrhage, and the meta-analysis literature A4 having a theme related to gastric ulcer. Since the themes of citing meta-analysis literature of the cited literature B2 vary widely as described above, the cited literature B2 is assumed not to be cited as the meta-analysis target literature (meta-analysis non-target literature).

The information processing apparatuses $1a$ and $1b$ described in the following embodiments achieve determination of whether a literature cited in citing meta-analysis literatures is a meta-analysis target literature, by determining correlativity of themes of the citing meta-analysis literatures based on a degree of similarity between the citing meta-analysis literatures.

(II) Description of First Embodiment

The information processing apparatus $1a$ of the first embodiment uses a literature vector to discriminate whether a literature cited in citing meta-analysis literatures is the meta-analysis target literature or not.

(A) Configuration

Figure 2:
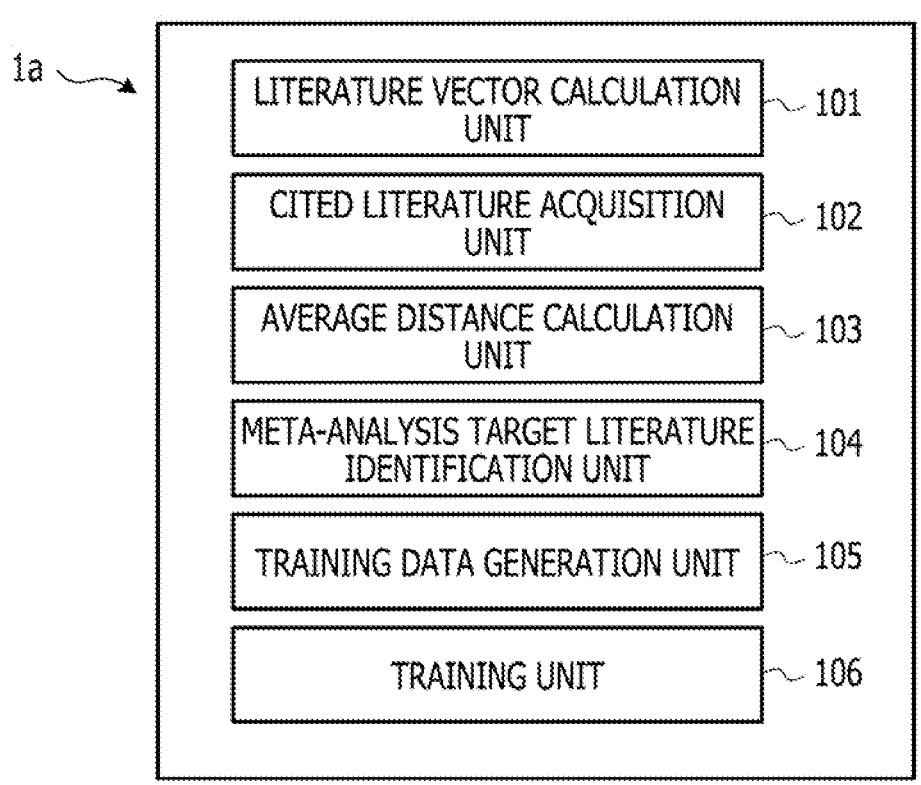
FIG. 2 schematically illustrates a functional configuration of the information processing apparatus being an example of the first embodiment.

FIG. 2 schematically illustrates a functional configuration of the information processing apparatus $1a$ being an example of the first embodiment.

The information processing apparatus $1a$ implements a training data generation function of generating training data to be used in creation of a machine learning model (classification model) for extraction of literatures cited in the meta-analysis literatures.

As illustrated in FIG. 2, the information processing apparatus 1a according to the first embodiment includes a literature vector calculation unit 101, a cited literature acquisition unit 102, an average distance calculation unit 103, a meta-analysis target literature identification unit 104, a training data generation unit 105, and a training unit 106.

A plurality of meta-analysis literatures collected in advance are used in the information processing apparatus 1a. Information about these meta-analysis literatures is stored in a specific storage area such as a memory 12 or a storage device 13 to be described later by using FIG. 14.

The literature vector calculation unit 101 calculates the literature vector of each of the plurality of meta-analysis literatures. The literature vector is information generated by vectorizing a literature, and is a document vector generated by converting texts constituting the literature into a vector. The literature vector corresponds to feature information indicating a feature of the meta-analysis literature. The literature vector may also be referred to as a text vector.

For example, the literature vector calculation unit 101 may generate the literature vector from an abstract or the like of the literature by using a known method such as doc2vec. Alternatively, the configuration may be such that a plurality of keywords are extracted from the meta-analysis literature and an average of word vectors corresponding to the respective keywords is obtained as the literature vector. The literature vector calculation unit 101 is not limited to these methods and may calculate the literature vector of the meta-analysis literature by using various known methods.

A value of the literature vector calculated by the literature vector calculation unit 101 is stored in a specific storage area such as the memory 12 or the storage device 13.

Figure 3:
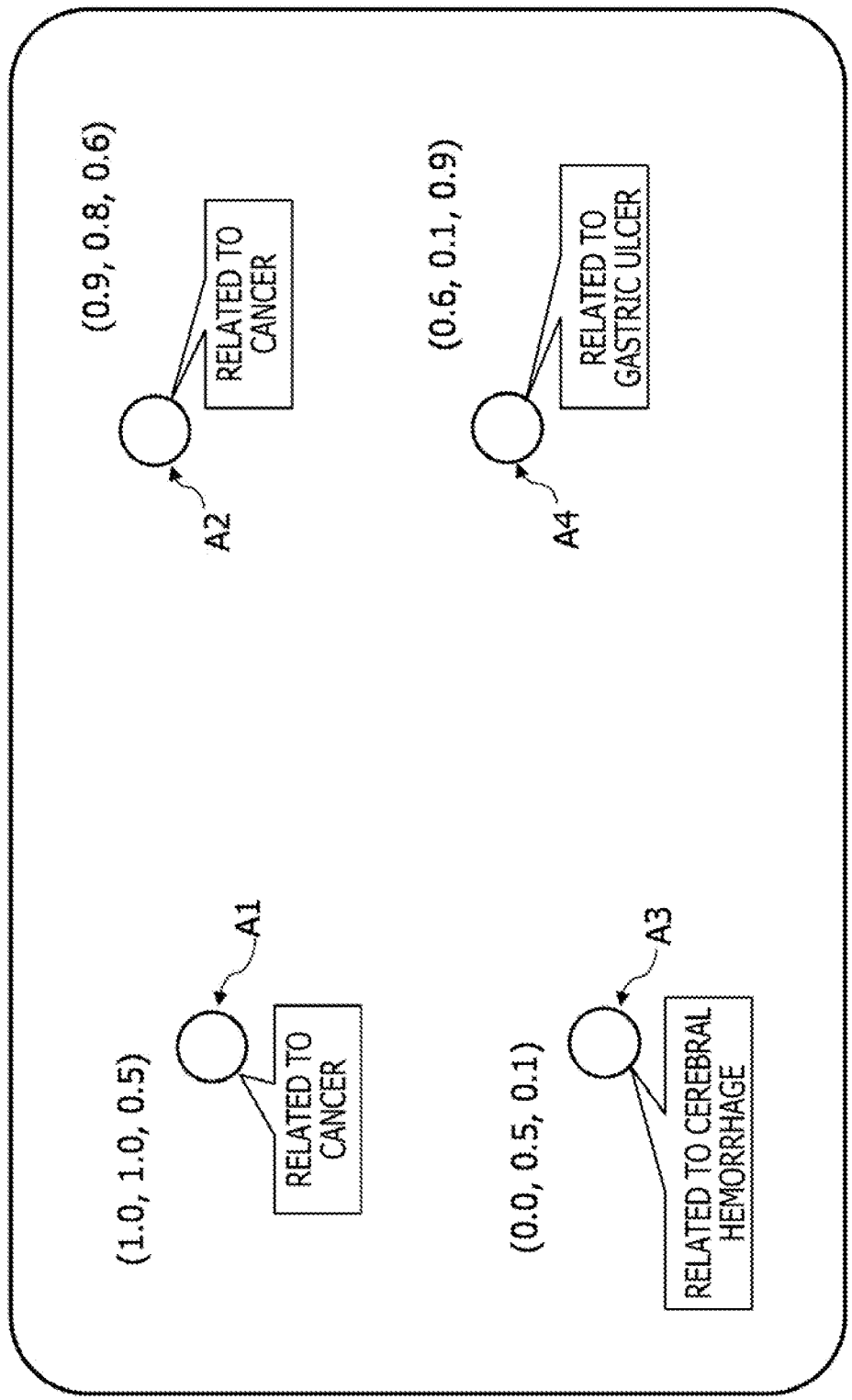
FIG. 3 illustrates literature vectors calculated by a literature vector calculation unit in the information processing apparatus being an example of the first embodiment.

FIG. 3 illustrates literature vectors calculated by the literature vector calculation unit 101 in the information processing apparatus 1a being an example of the first embodiment.

Examples illustrated in FIG. 3 correspond to the meta-analysis literatures A1 to A4 and the literatures B1 to B6 illustrated in FIG. 1.

FIG. 3 illustrates literature vectors calculated for the respective four meta-analysis literatures A1 to A4. For example, the literature vector of the meta-analysis literature A1 is (1.0, 1.0, 0.5).

The cited literature acquisition unit 102 acquires literatures (cited literatures) cited in each meta-analysis literature. For example, a known literature database such as PubMed (registered trademark) may be used to acquire such cited literatures.

The cited literatures acquired by the cited literature acquisition unit 102 are stored in a specific storage area such as the memory 12 or the storage device 13.

Figure 4:
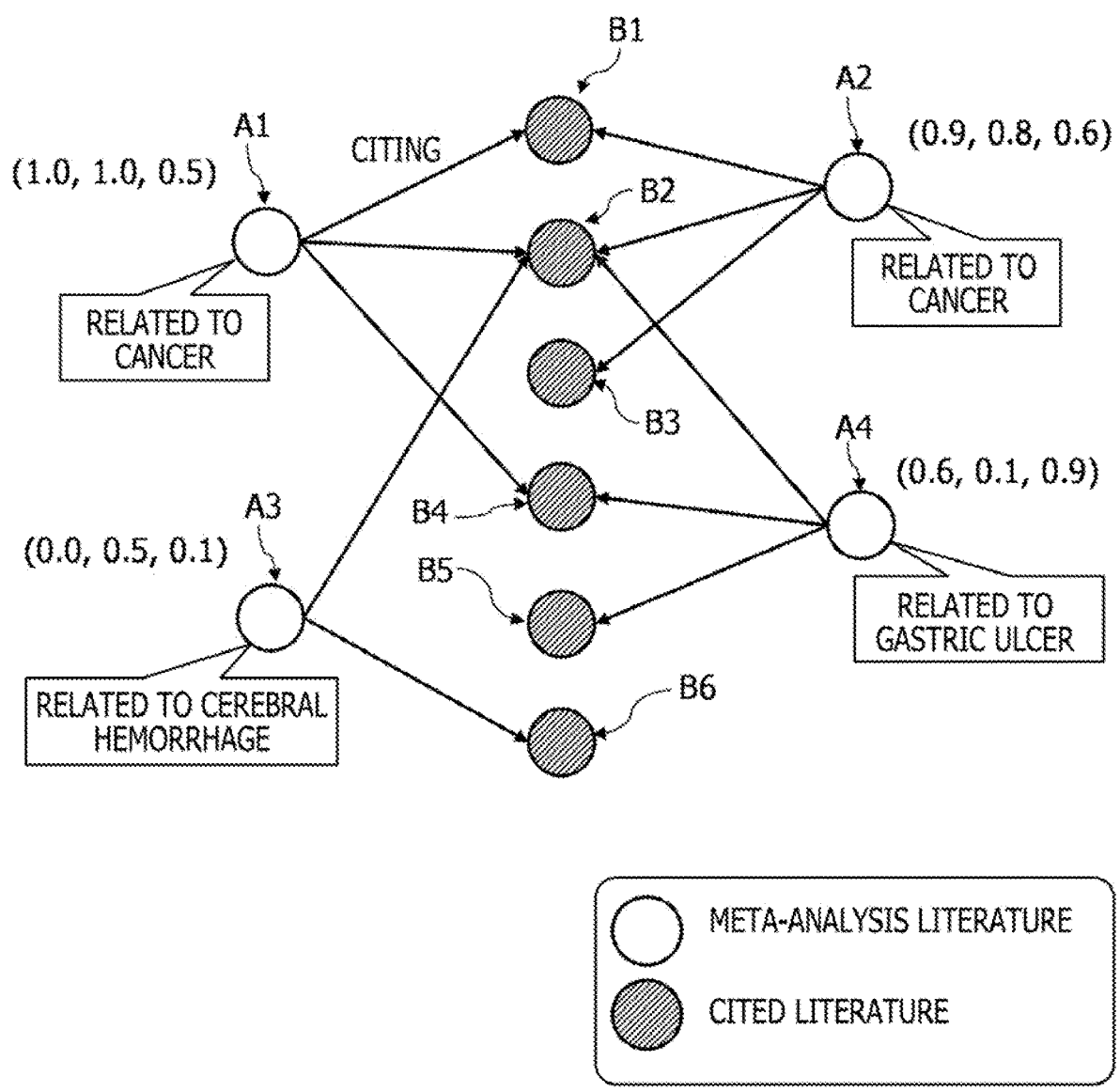
FIG. 4 schematically illustrates cited literatures acquired by a cited literature acquisition unit in the information processing apparatus being an example of the first embodiment.

FIG. 4 schematically illustrates cited literatures acquired by the cited literature acquisition unit 102 in the information processing apparatus 1a being an example of the first embodiment.

Examples illustrated in FIG. 4 correspond to the meta-analysis literatures A1 to A4 and the literatures B1 to B6 illustrated in FIG. 1. For example, the cited literature B1 is cited in the meta-analysis literatures A1 and A2, and the cited literature B2 is cited in the meta-analysis literatures A1 to A4.

The average distance calculation unit 103 calculates an average of distances from the center of gravity of the literature vectors corresponding to the citing meta-analysis literatures, for each of the cited literatures acquired by the cited literature acquisition unit 102.

For example, for each cited literature, the average distance calculation unit 103 first calculates the center of gravity of the literature vectors corresponding to the respective citing meta-analysis literatures. The average distance calculation unit 103 calculates the distances from the center of gravity to the respective literature vectors corresponding to the respective meta-analysis literatures, and calculates an average value (average distance) of the distances from the center of gravity for each cited literature.

When there is one citing meta-analysis literature, the literature vector and the center of gravity coincide with each other and the average distance is thus 0.

Figure 5:
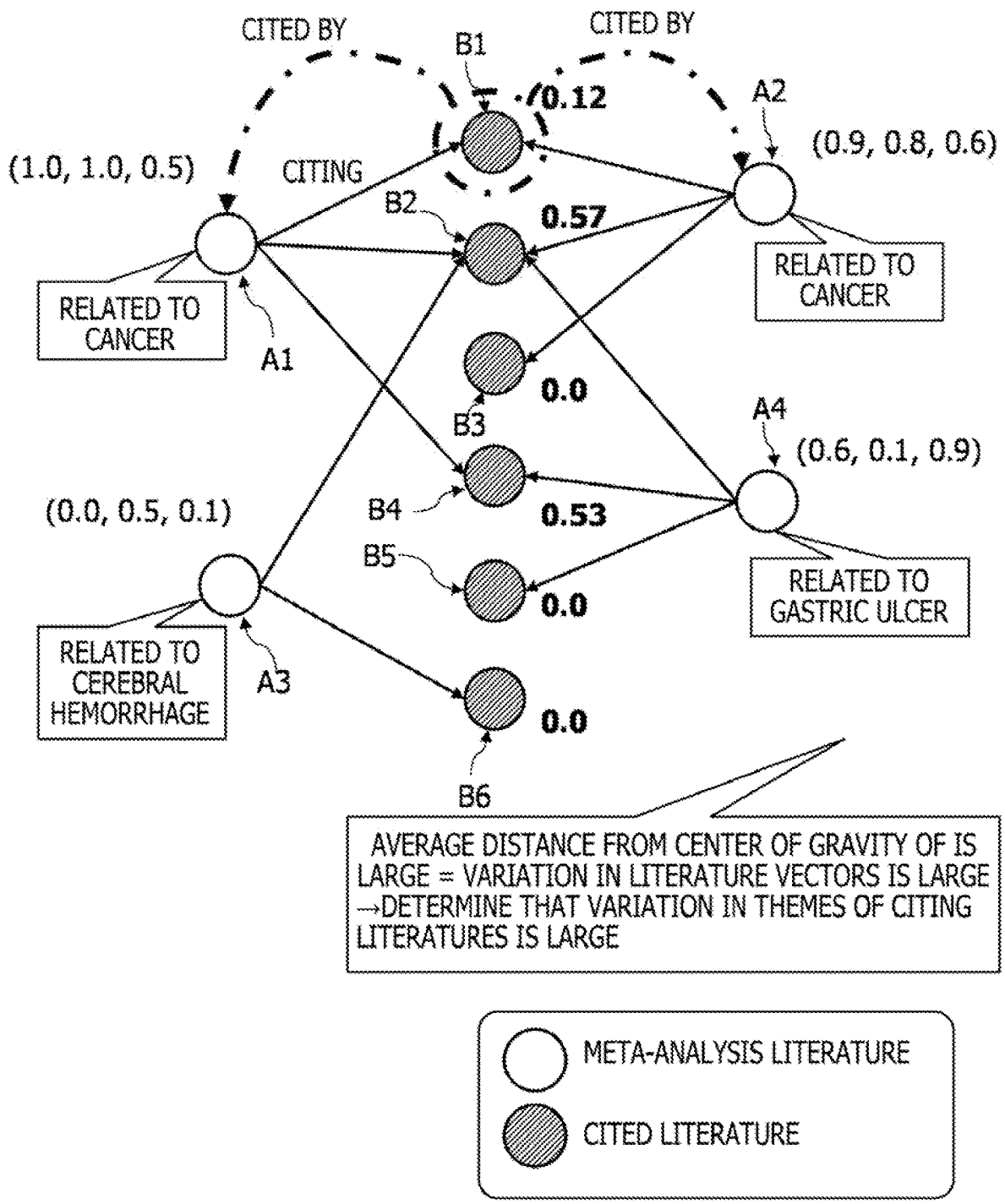
FIG. 5 illustrates an average distance calculated by an average distance calculation unit in the information processing apparatus being an example of the first embodiment.

FIG. 5 illustrates the average distance calculated by the average distance calculation unit 103 in the information processing apparatus 1a being an example of the first embodiment.

Examples illustrated in FIG. 5 correspond to the meta-analysis literatures A1 to A4 and the literatures B1 to B6 illustrated in FIG. 1.

For example, in FIG. 5, for the cited literature B1, the average distance calculation unit 103 acquires the center of gravity of the literature vectors of the respective meta-analysis literatures (citing meta-analysis literatures) A1 and A2 in which the cited literature B1 is cited.

The center of gravity $G_{(A1, A2)}$ of the literature vectors of the respective meta-analysis literatures A1 and A2 may be expressed by the following formula.

Center of gravity $G_{(A1,A2)}=((1.0+0.9)/2,(1.0+0.8)/2, (0.5+0.6)/2)=(0.95,0.9,0.55)$ Next, the average distance calculation unit 103 calculates an average of the distances from the calculated center of gravity $G_{(A1, A2)}$ to the literature vectors of the respective meta-analysis literatures A1 and A2. The average of distances from the center of gravity $G_{(A1, A2)}$ to the literature vectors of the respective meta-analysis literatures A1 and A2 is obtained by the following formula.

$$\left(\sqrt{(1.0 - 0.95)^2 + (1.0 - 0.9)^2 + (0.5 - 0.55)^2} + \sqrt{(0.9 - 0.95)^2 + (0.8 - 0.9)^2 + (0.6 - 0.55)^2}\right)/2 \approx 0.12$$

The average value of the distances from the center of gravity of the literature vectors corresponding to the respective citing meta-analysis literatures to the literature vectors of the respective meta-analysis literatures for each cited literature may be hereinafter referred to as a vector average distance. The vector average distance indicates similarity between the plurality of meta-analysis literatures, and a small vector average distance indicates that the similarity is high, for example, the meta-analysis literatures are similar to each other.

The average distance calculation unit 103 calculates the average distance (vector average distance) from the center of gravity of the literature vectors corresponding to the citing meta-analysis literatures, for each of the literatures B1 to B6 in a similar method.

The vector average distance for each of the cited literatures calculated by the average distance calculation unit 103 is stored in a specific storage area such as the memory 12 or the storage device 13.

The meta-analysis target literature identification unit 104 identifies (determines) whether the cited literature being the target of discrimination is the meta-analysis target literature or the meta-analysis non-target literature based on the vector average distance calculated for the cited literature by the average distance calculation unit 103.

As described above, the vector average distance calculated by the average distance calculation unit 103 being large means that variation in the literature vectors of the citing meta-analysis literatures is large for the cited literature. For example, the vector average distance being large may be considered as variation in the themes of the citing meta-analysis literatures being large. The variation in the themes of the citing meta-analysis literatures being large for the cited literature as described above means that the themes of the citing meta-analysis literatures vary widely. Accordingly, it is assumed that the cited literature is not cited as the meta-analysis target literature (is the meta-analysis non-target literature).

Meanwhile, the vector average distance calculated by the average distance calculation unit 103 being small means that the variation in the literature vectors of the citing meta-analysis literatures is small for the cited literature. For example, the vector average distance being small may be considered as the variation in the themes of the citing meta-analysis literatures being small. The variation in the themes of the citing meta-analysis literatures being small for the cited literature as described above means that the themes of the citing meta-analysis literatures do not vary widely. Accordingly, it is assumed that the cited literature is cited as the meta-analysis target literature (is the meta-analysis target literature).

The meta-analysis target literature identification unit 104 thus compares the value of the vector average distance (vector average value) calculated for the cited literature with a threshold, and determines that the cited literature is the meta-analysis target literature when the vector average value is equal to or lower than the threshold. Meanwhile, the meta-analysis target literature identification unit 104 determines that the cited literature is the meta-analysis non-target literature when the vector average value is higher than the threshold.

In the first embodiment, an inverse of the vector average value corresponds to the degree of similarity, and the vector average value being equal to or lower than the threshold corresponds to the degree of similarity of the meta-analysis literatures being equal to or higher than a threshold.

The meta-analysis target literature identification unit 104 registers information on the cited literature determined to be the meta-analysis target literature in a list of meta-analysis target literatures, and registers information on the cited literature determined to be the meta-analysis non-target literature in a list of meta-analysis non-target literatures.

The threshold used for the comparison with the vector average value may be set according to, for example, an empirical rule based on one or more specific examples, and the comparison may be performed with the threshold changed as appropriate.

Figure 6:
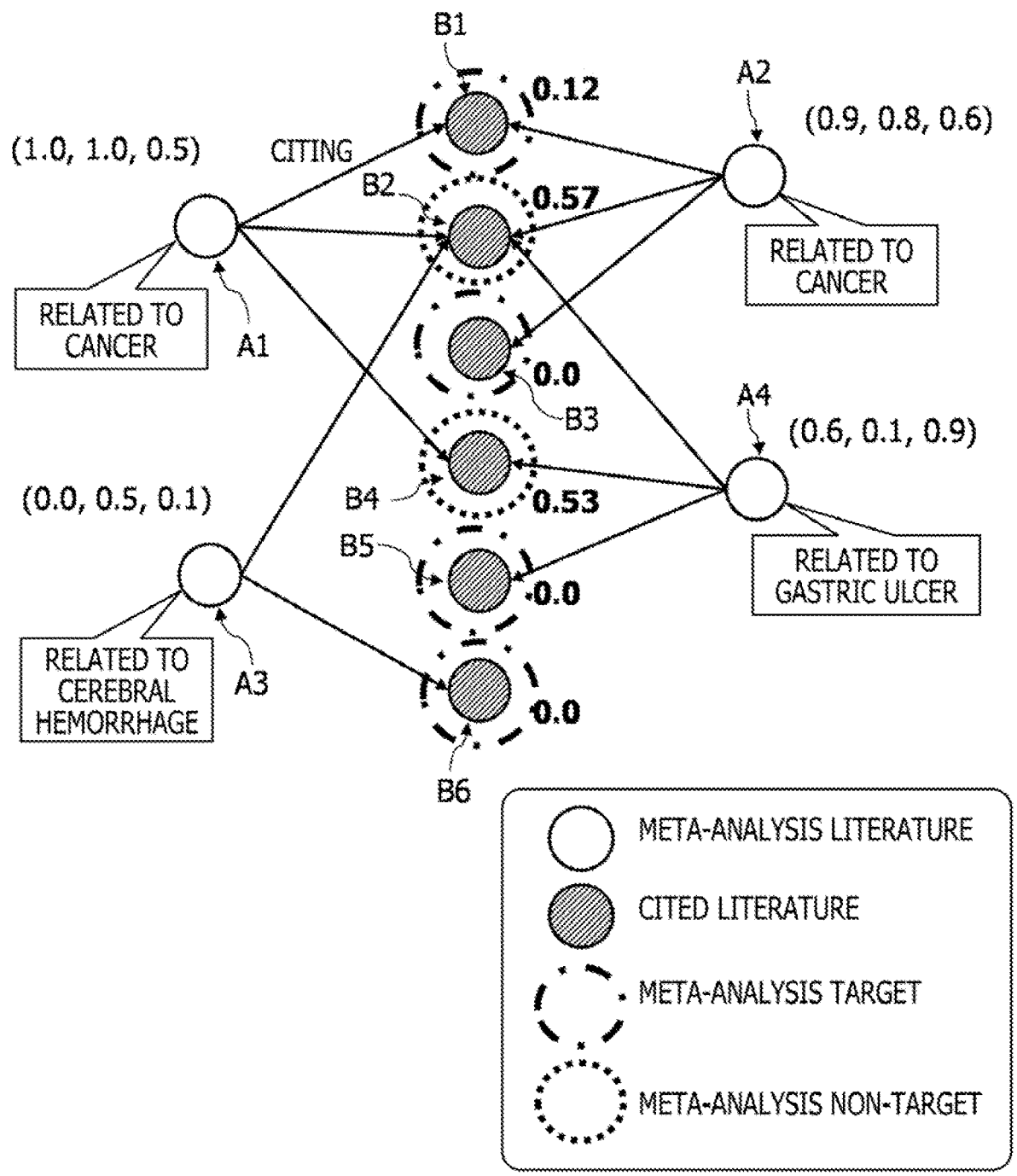
FIG. 6 explains processing performed by a meta-analysis target literature identification unit in the information processing apparatus being an example of the first embodiment.

FIG. 6 explains processing performed by the meta-analysis target literature identification unit 104 in the information processing apparatus 1*a* being an example of the first embodiment.

Examples illustrated in FIG. 6 correspond to the meta-analysis literatures A1 to A4 and the literatures B1 to B6 illustrated in FIG. 1.

FIG. 6 illustrates an example in which the meta-analysis target literature identification unit 104 identifies whether each cited literature is the meta-analysis target literature or the meta-analysis non-target literature by comparing the vector average value calculated for the cited literature with a threshold of 0.3.

For example, the meta-analysis target literature identification unit 104 determines that the cited literature B2 having a vector average value of 0.57 and the cited literature B4 having a vector average value of 0.53 are the meta-analysis non-target literatures. The meta-analysis target literature identification unit 104 determines that the cited literatures B1, B3, B5, and B6 each having a vector average value of 0.3 or lower are the meta-analysis target literatures.

Results of the determination (list of meta-analysis target literatures/list of meta-analysis non-target literatures) by the meta-analysis target literature identification unit 104 are stored in a specific storage area such as the memory 12 or the storage device 13.

The literature vector calculation unit 101, the cited literature acquisition unit 102, the average distance calculation unit 103, and the meta-analysis target literature identification unit 104 described above function as a meta-analysis target literature determination unit that determines the meta-analysis target literature.

The training data generation unit 105 generates the training data to be used in creation of the machine learning model (classification model) for extraction of literatures cited in the meta-analysis literatures, by using the results of determination by the meta-analysis target literature identification unit 104.

For example, the training data generation unit 105 generates the training data by combining each of the cited literatures determined to be the meta-analysis target literature by the meta-analysis target literature identification unit 104, with information indicating that the cited literature is the meta-analysis target literature as correct data. The training data generation unit 105 generates the training data that includes a literature with a vector average value equal to or lower than the threshold, for example, a literature for which the degree of similarity of the meta-analysis literatures is equal to or higher than the threshold, as the meta-analysis target literature.

The training data generated by the training data generation unit 105 is stored in a specific storage area such as the memory 12 or the storage device 13.

The training unit 106 executes training of the machine learning model for extracting literatures cited in the meta-analysis literatures, by using the training data generated by the training data generation unit 105. The machine learning model determines whether a literature is the target of meta-analysis (meta-analysis target literature).

Information (for example, various parameters) on the machine learning model trained by the training unit 106 is stored in a specific storage area such as the memory 12 or the storage device 13.

(B) Operation

Figure 7:
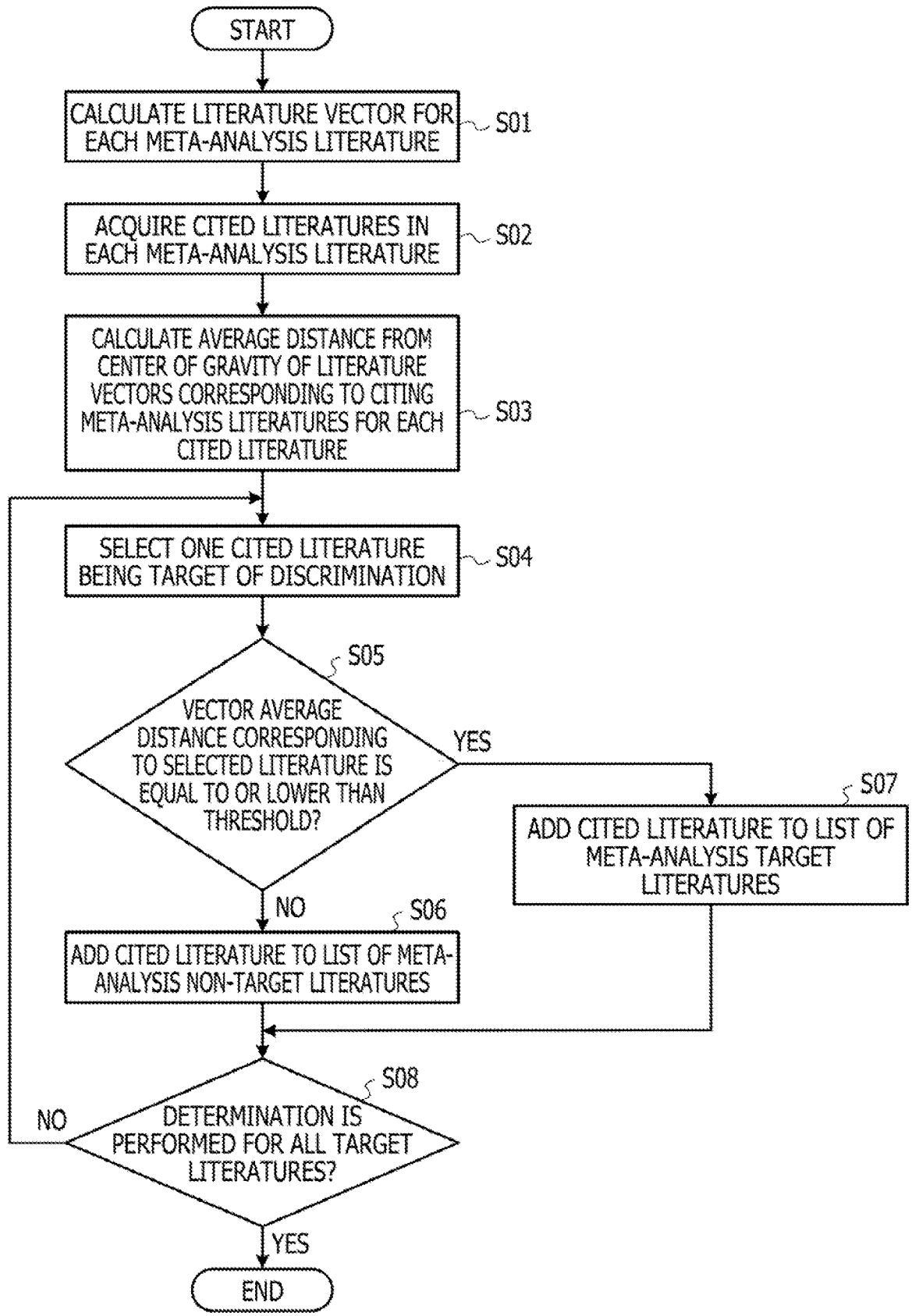
FIG. 7 is a flowchart for explaining a processing method of determining the meta-analysis target literature in the information processing apparatus being an example of the first embodiment.

A processing method of determining the meta-analysis target literature in the information processing apparatus 1*a* being an example of the first embodiment and configured as described above is described according to a flowchart (steps S01 to S08) illustrated in FIG. 7.

In step S01, the literature vector calculation unit 101 calculates the literature vector for each of the plurality of meta-analysis literatures.

In step S02, the cited literature acquisition unit 102 acquires the cited literatures cited in each meta-analysis literature. All of the acquired cited literatures are treated as targets of discrimination of whether the literature is the meta-analysis target literature or not.

In step S03, for each cited literature acquired by the cited literature acquisition unit 102, the average distance calculation unit 103 calculates the average distance (vector average distance) from the center of gravity of the literature vectors corresponding to the citing meta-analysis literatures to the literature vectors of the respective meta-analysis literatures.

In step S04, the meta-analysis target literature identification unit 104 selects one of the one or more cited literatures being the targets of discrimination.

In step S05, the meta-analysis target literature identification unit 104 compares the value of the vector average distance corresponding to the selected cited literature with the threshold. When the vector average distance is equal to or lower than the threshold in the result of the comparison (see YES route in step S05), the processing proceeds to step S07.

In step S07, the meta-analysis target literature identification unit 104 determines that the selected cited literature is the meta-analysis target literature, and registers the selected cited literature in the list of meta-analysis target literatures.

Meanwhile, when the vector average distance is higher than the threshold in the result of the comparison in step S05 (see NO route in step S05), the processing proceeds to step S06.

In step S06, the meta-analysis target literature identification unit 104 determines that the selected cited literature is the meta-analysis non-target literature, and registers the selected cited literature in the list of meta-analysis non-target literatures.

Then, in step S08, the meta-analysis target literature identification unit 104 checks whether the processes of steps S05 to S07 are executed, for example, the discrimination of whether the cited literature is the meta-analysis target literature or not is performed for all cited literatures being the targets of discrimination.

When the discrimination (determination) is not performed for all cited literatures being the targets of discrimination in the result of the check (see NO route in step S08), the processing returns to step S04. In step S04, the cited literature not subjected to the discrimination of whether the cited literature is the meta-analysis target literature or not is selected from the cited literatures being the targets of discrimination.

Meanwhile, when the discrimination (determination) is performed for all cited literatures being the targets of discrimination (see YES route in step S08), the processing is terminated.

The training data generation unit 105 generates the training data by combining each of the cited literatures determined to be the meta-analysis target literature by the meta-analysis target literature identification unit 104, with the information indicating that the cited literature is the meta-analysis target literature as correct data. The training unit 106 trains the machine learning model by using the generated training data.

(C) Effects

As described above, according to the information processing apparatus 1a being an example of the first embodiment, the literature vector calculation unit 101 calculates the literature vector of each of the plurality of meta-analysis literatures. For each of the cited literatures cited in the meta-analysis literatures, the average distance calculation unit 103 acquires the center of gravity of the literature vectors corresponding to the citing meta-analysis literatures. The average distance calculation unit 103 calculates the average (vector average distance) of the distances from the center of gravity to the literature vectors corresponding to the respective meta-analysis literatures.

The meta-analysis target literature identification unit 104 compares the vector average value calculated for each cited literature with the threshold, and determines that the cited literature is the meta-analysis target literature when the vector average value is equal to or lower than the threshold. When the vector average value is higher than the threshold, the meta-analysis target literature identification unit 104 determines that the cited literature is the meta-analysis non-target literature.

For example, the meta-analysis target literature and the meta-analysis non-target literature may be easily identified by comparing the vector average value with the threshold. Consequently, the training data to be used in the training (machine learning) of the machine learning model (classification model) for extraction of literatures cited in the meta-analysis literatures may be easily generated.

The vector average distance being large in this case may be considered that the variation in the literature vectors of the citing meta-analysis literatures is large and the variation in the themes of the citing meta-analysis literatures is large for the cited literature. The variation in the themes of the citing meta-analysis literatures being large for the cited literature means that the themes of the citing meta-analysis literatures vary widely and it may be considered that the cited literature is the meta-analysis non-target literature.

Meanwhile, the vector average distance being small may be considered that the variation in the literature vectors of the citing meta-analysis literatures is small and the variation in the themes of the citing meta-analysis literatures is small for the cited literature. The variation in the themes of the citing meta-analysis literatures being small for the cited literature means that the themes of the citing meta-analysis literatures do not vary widely and it may be considered that the cited literature is the meta-analysis target literature.

As described above, the information processing apparatus 1a of the first embodiment may accurately discriminate the meta-analysis non-target literatures and the meta-analysis target literatures from each other, and generate high-quality training data.

(III) Description of Second Embodiment

The information processing apparatus 1b of the second embodiment uses clustering to discriminate whether a literature cited in the citing meta-analysis literatures is the meta-analysis target literature or not.

(A) Configuration

Figure 8:
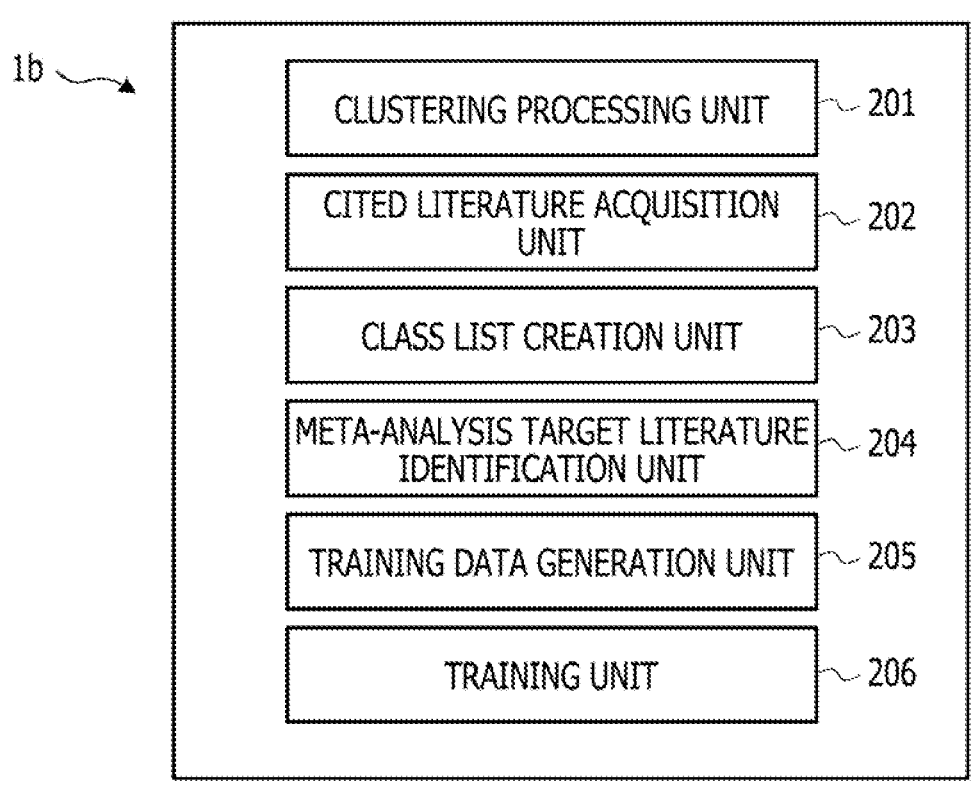
FIG. 8 schematically illustrates a functional configuration of the information processing apparatus being an example of the second embodiment.

FIG. 8 schematically illustrates a functional configuration of the information processing apparatus 1b being an example of the second embodiment.

Like the information processing apparatus 1a according to the first embodiment, the information processing apparatus 1b also implements the training data generation function of generating the training data to be used in creation of the machine learning model (classification model) for extraction of literatures cited in the meta-analysis literatures.

As illustrated in FIG. 8, the information processing apparatus 1b according to the second embodiment includes a clustering processing unit 201, a cited literature acquisition unit 202, a class list creation unit 203, a meta-analysis target literature identification unit 204, a training data generation unit 205, and a training unit 206.

A plurality of meta-analysis literatures collected in advance are used in the information processing apparatus 1b. Information related to these meta-analysis literatures is stored in a specific storage area such as the memory 12 or the storage device 13.

The clustering processing unit 201 applies clustering to the plurality of meta-analysis literatures and acquires a class of each meta-analysis literature.

For example, the clustering processing unit 201 may set a class for each meta-analysis literature by using a k-means method. The clustering method by the clustering processing unit 201 is not limited to the k-means method, and may be performed with various modifications.

The class of each meta-analysis literature set by performing the clustering on the meta-analysis literature corresponds to the feature information indicating the feature of the meta-analysis literature.

Figure 9:
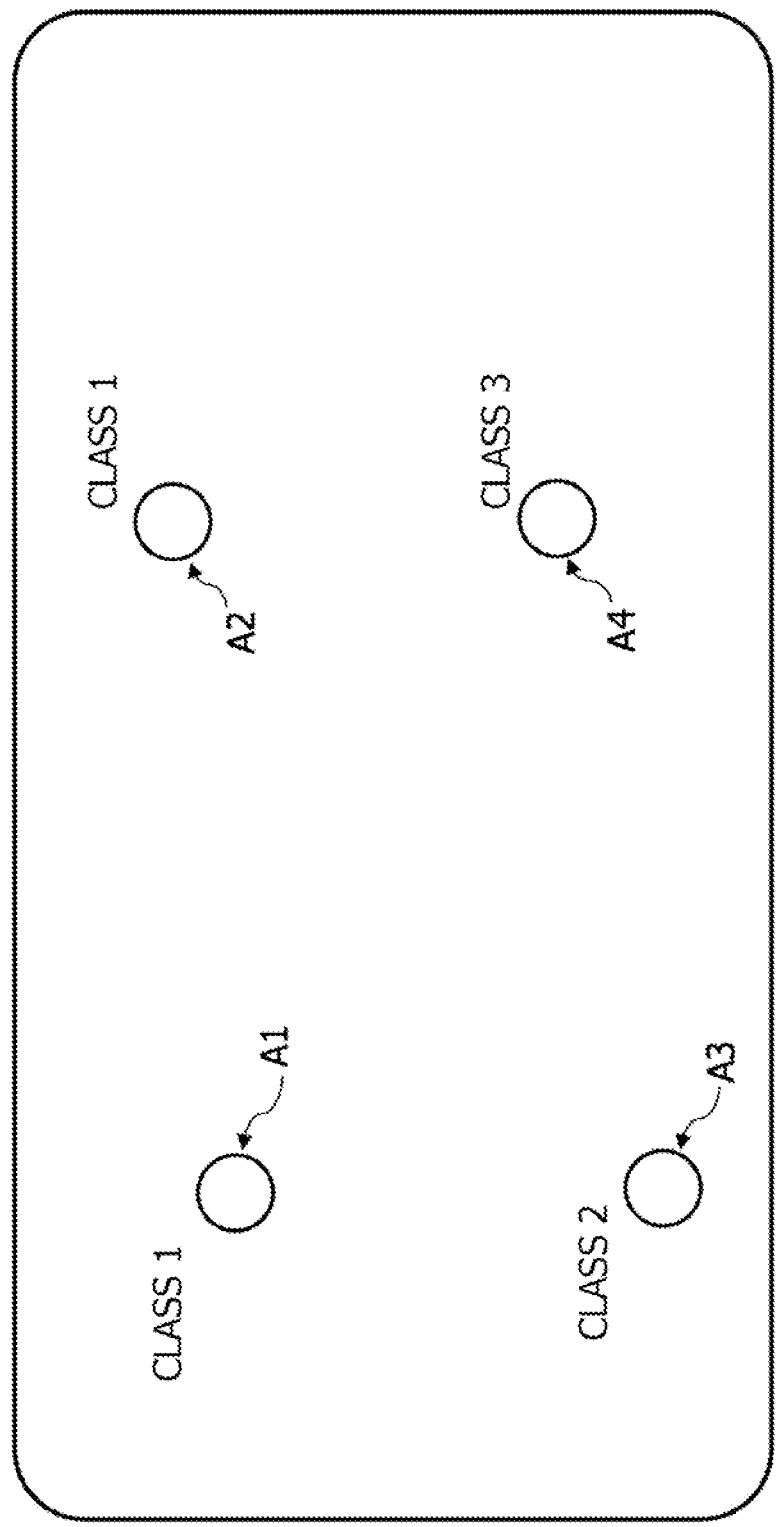
FIG. 9 schematically illustrates the meta-analysis literatures for which a clustering processing unit in the information processing apparatus being an example of the second embodiment has set the classes.

FIG. 9 schematically illustrates the meta-analysis literatures for which the clustering processing unit 201 in the information processing apparatus 1b being an example of the second embodiment has set the classes.

Examples illustrated in FIG. 9 correspond to the meta-analysis literatures A1 to A4 and the literatures B1 to B6 illustrated in FIG. 1.

In the example illustrated in FIG. 9, each of the four meta-analysis literatures A1 to A4 is subjected to the clustering, and class 1 is set for the meta-analysis literatures A1 and A2, class 2 is set for the meta-analysis literature A3, and class 3 is set for the meta-analysis literature A4.

The cited literature acquisition unit 202 acquires literatures (cited literatures) cited in each meta-analysis literature. For example, as in the first embodiment, a known literature database such as PubMed may be used to acquire such cited literatures.

The cited literatures acquired by the cited literature acquisition unit 202 are stored in a specific storage area such as the memory 12 or the storage device 13.

Figure 10:
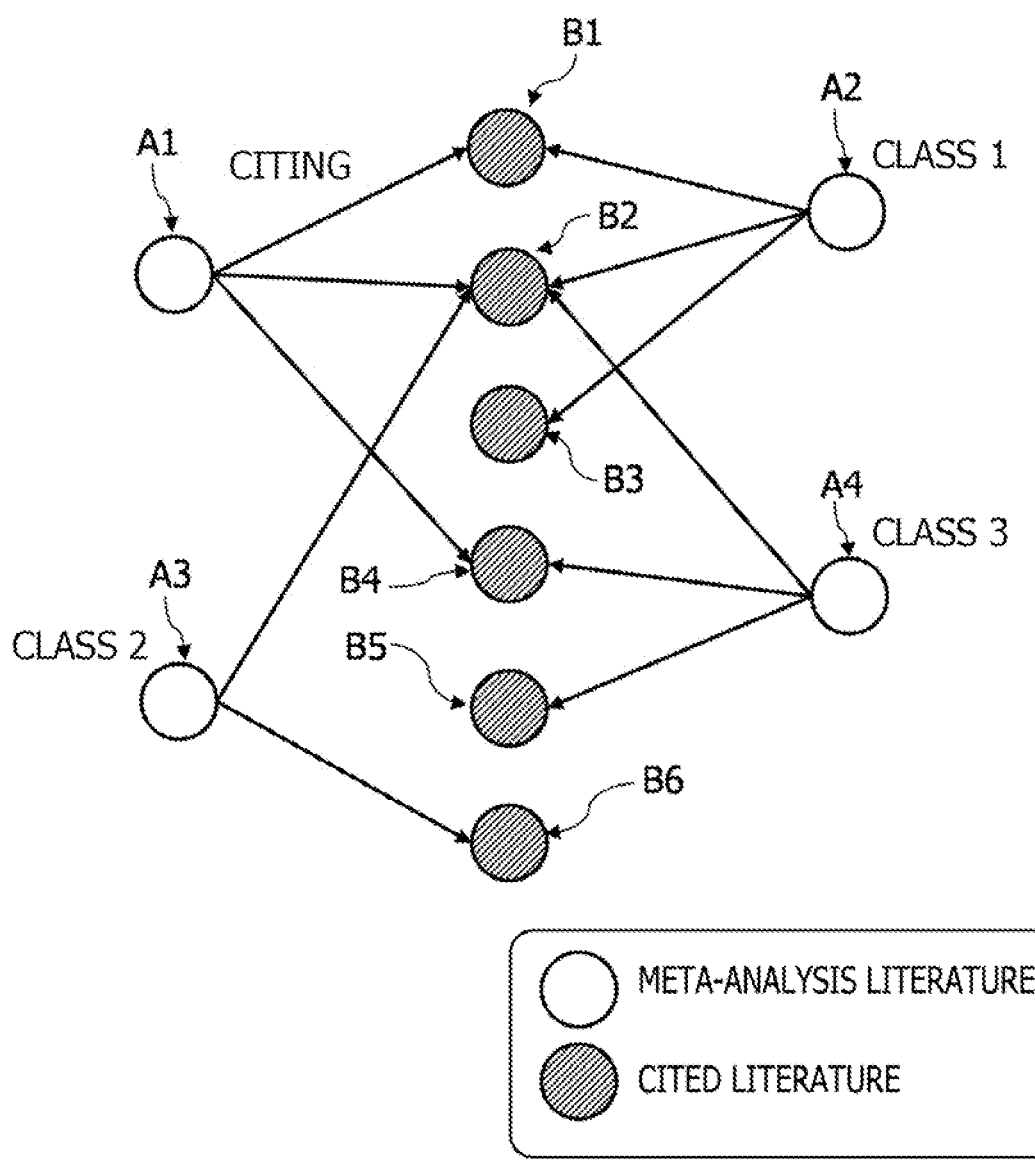
FIG. 10 schematically illustrates the cited literatures acquired by a cited literature acquisition unit in the information processing apparatus being an example of the second embodiment.

FIG. 10 schematically illustrates the cited literatures acquired by the cited literature acquisition unit 202 in the information processing apparatus 1b being an example of the second embodiment.

Examples illustrated in FIG. 10 correspond to the meta-analysis literatures A1 to A4 and the literatures B1 to B6 illustrated in FIG. 1. For example, the cited literature B1 is cited in the meta-analysis literatures A1 and A2, and the cited literature B2 is cited in the meta-analysis literatures A1 to A4.

The class list creation unit 203 creates a list of classes corresponding to the citing meta-analysis literatures, for each of the cited literatures acquired by the cited literature acquisition unit 102.

For example, for each cited literature, the class list creation unit 203 acquires and lists the class of each of one or more meta-analysis literatures in which the cited literature is cited. Hereinafter, the list of classes may be referred to as a class list. For example, the class list may be expressed by listing one or more corresponding classes.

Figure 11:
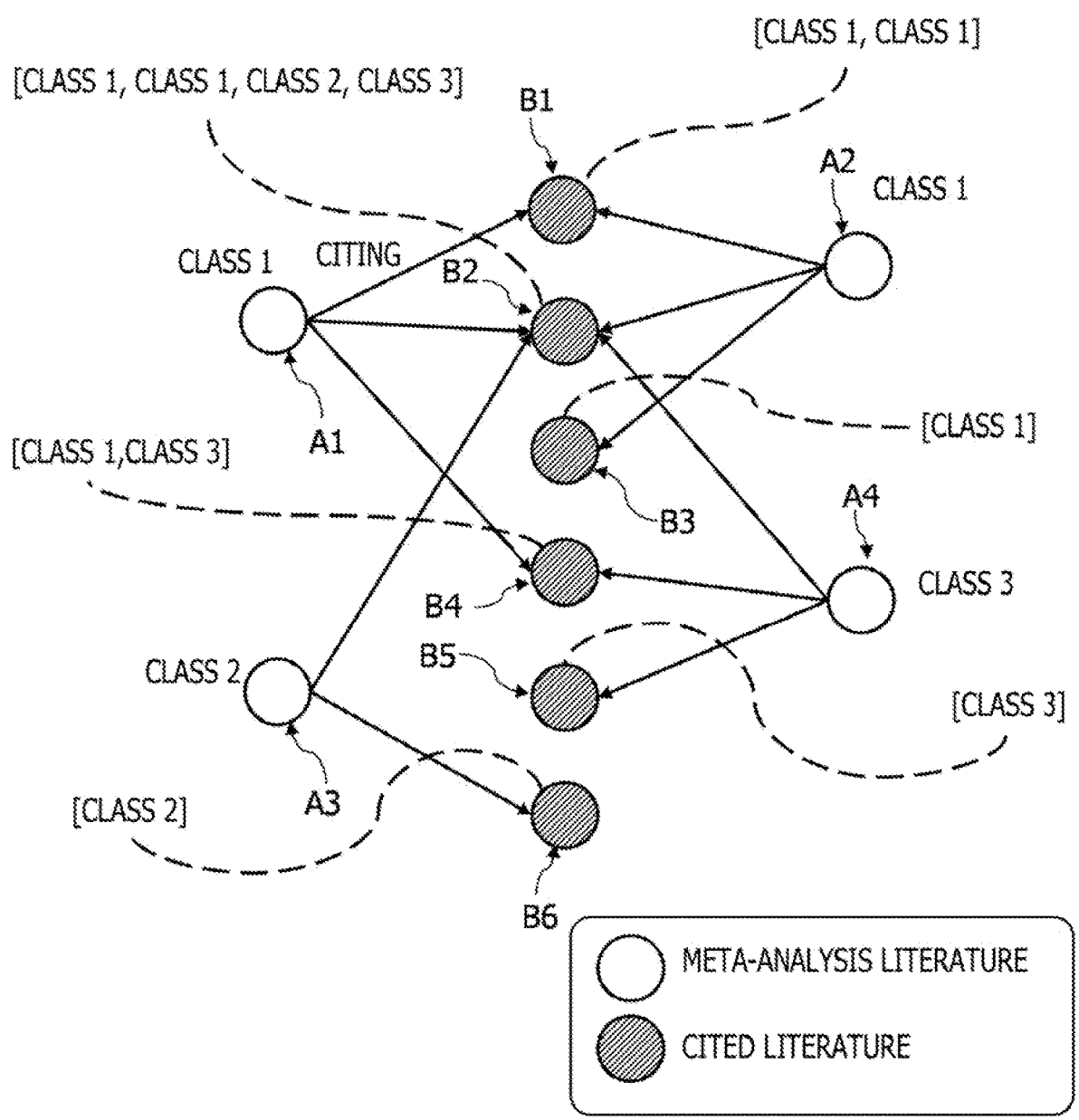
FIG. 11 illustrates a class list calculated by a class list creation unit in the information processing apparatus being an example of the second embodiment.

FIG. 11 illustrates a class list calculated by the class list creation unit 203 in the information processing apparatus 1b being an example of the second embodiment.

Examples illustrated in FIG. 11 correspond to the meta-analysis literatures A1 to A4 and the literatures B1 to B6 illustrated in FIG. 1.

For example, in FIG. 11, for the cited literature B1, the class list creation unit 203 acquires the classes of the respective meta-analysis literatures (citing meta-analysis literatures) A1 and A2 in which the cited literature B1 is cited. Since the classes of the meta-analysis literatures A1 and A2 are both class 1, the class list creation unit 203 creates a class list [class 1, class 1] of the cited literature B1.

For example, for the cited literature B2, the class list creation unit 203 acquires the classes of the respective meta-analysis literatures (citing meta-analysis literatures) A1 to A4 in which the cited literature B2 is cited. The classes of the meta-analysis literatures A1 and A2 are both class 1, the class of the meta-analysis literature A3 is class 2, and the class of the meta-analysis literature A4 is class 3. Accordingly, the class list creation unit 203 creates [class 1, class 1, class 2, class 3] as the class list of the cited literature B2.

The class list creation unit 203 calculates variation in the class list for each cited literature. For example, the class list creation unit 203 may acquire the variation by calculating an average information amount.

For example, when a class is randomly selected from a class list [class 1, class 1], the following relationship is established.

Probability of selected class being class 1:1 Accordingly, the variation may be obtained by the following formula.

$$-1 \log_2 1 = 0.0$$

For example, when a class is randomly selected from the class list [class 1, class 1, class 2, class 3], the following relationships are established.

Probability of selected class being class 1:½
Probability of selected class being class 2:¼
Probability of selected class being class 3:¼ Accordingly, the variation may be obtained by the following formula.

$$-\tfrac{1}{2} \log_2 \tfrac{1}{2} - \tfrac{1}{4} \log_2 \tfrac{1}{4} - \tfrac{1}{4} \log_2 \tfrac{1}{4} = 1.5$$

For example, when a class is randomly selected from a class list [class 1, class 3], the following relationship is established.

Probability of selected class being class 1:½
Probability of selected class being class 3:½ Accordingly, the variation may be obtained by the following formula.

$$-\tfrac{1}{2} \log_2 \tfrac{1}{2} - \tfrac{1}{2} \log_2 \tfrac{1}{2} = 1.0$$

The variation indicates the degree of similarity among the plurality of meta-analysis literatures (A1 to A4). The calculation of the variation is not limited to the aforementioned method using the average information amount, and may be performed with modifications as appropriate. For example, the class list creation unit 203 may calculate the variation in the class list by using variance or standard deviation, and the calculation may be performed with various modifications.

The class lists generated by the class list creation unit 203 and the variation values calculated by the class list creation unit 203 are stored in a specific storage area such as the memory 12 or the storage device 13.

The meta-analysis target literature identification unit 204 identifies (determines) whether the cited literature being the target of discrimination is the meta-analysis target literature or the meta-analysis non-target literature based on the variation value for the cited literature calculated by the class list creation unit 203.

As described above, when the variation calculated by the class list creation unit 203 is large, it may be considered that the variation in the themes of the citing meta-analysis literatures is large. The variation in the themes of the citing meta-analysis literatures being large for the cited literature as described above means that the themes of the citing meta-analysis literatures vary widely. Accordingly, it is assumed that the cited literature is not cited as the meta-analysis target literature (is the meta-analysis non-target literature).

Meanwhile, when the variation calculated by the class list creation unit 203 is small, it may be considered that the variation in the themes of the citing meta-analysis literatures is small. The variation in the themes of the citing meta-analysis literatures being small for the cited literature as described above means that the themes of the citing meta-analysis literatures do not vary widely. Accordingly, it is assumed that the cited literature is cited as the meta-analysis target literature (is the meta-analysis target literature).

The meta-analysis target literature identification unit 204 thus compares the variation value calculated for the cited literature with a threshold, and determines that the cited literature is the meta-analysis target literature when the variation value is equal to or lower than the threshold. Meanwhile, the meta-analysis target literature identification unit 204 determines that the cited literature is the meta-analysis non-target literature when the variation value is higher than the threshold. In the second embodiment, an inverse of the variation value corresponds to the degree of similarity, and the variation value being equal to or lower than the threshold corresponds to the degree of similarity of the meta-analysis literatures being equal to or higher than the threshold.

The meta-analysis target literature identification unit 204 registers information on the cited literature determined to be the meta-analysis target literature in the list of meta-analysis target literatures, and registers information on the cited literature determined to be the meta-analysis non-target literature in the list of meta-analysis non-target literatures.

The threshold used for the comparison with the variation value may be set according to, for example, an empirical rule based on one or more specific examples, and the comparison may be performed with the threshold changed as appropriate.

Figure 12:
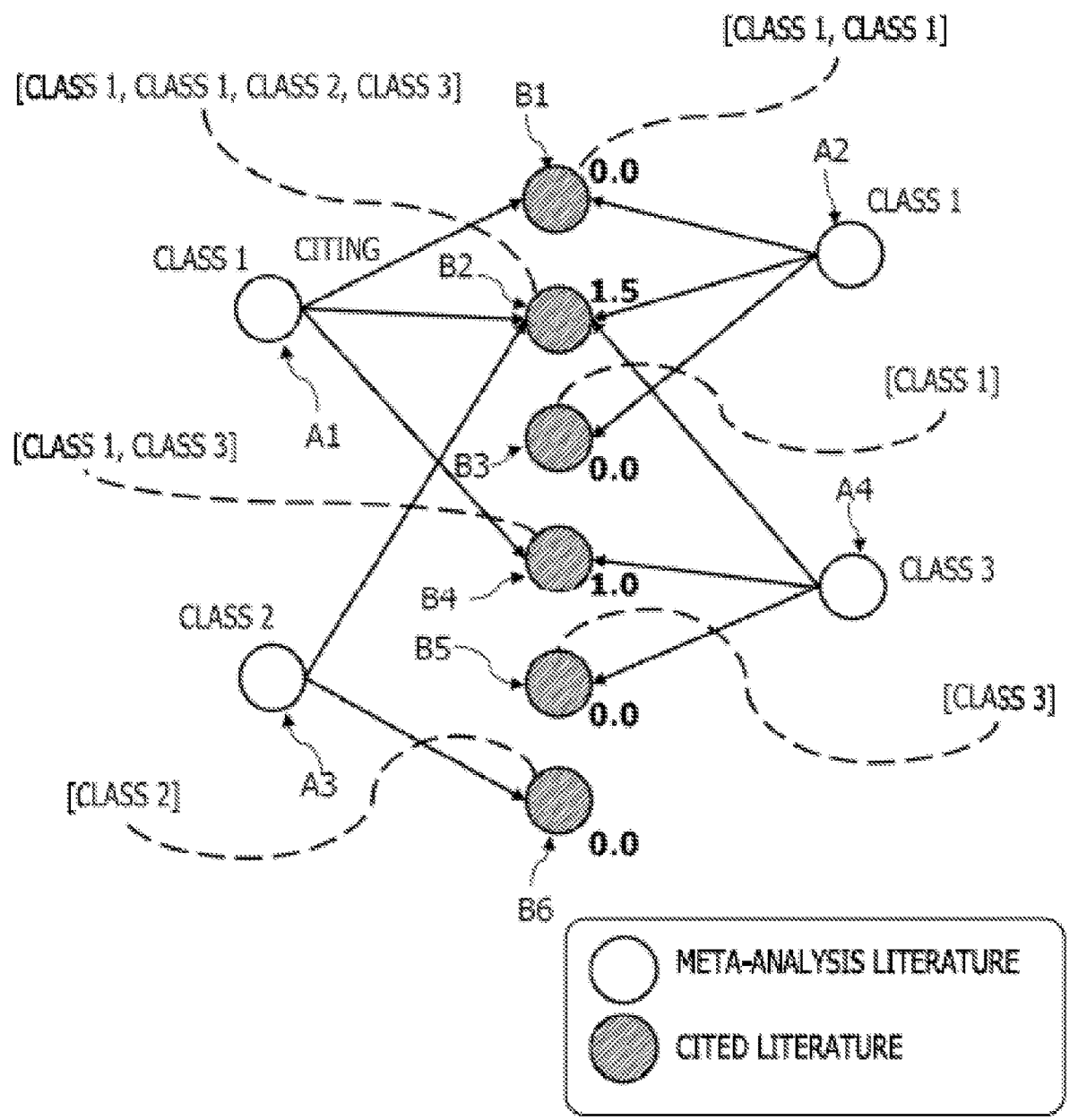
FIG. 12 explains processing performed by a meta-analysis target literature identification unit in the information processing apparatus being an example of the second embodiment.

FIG. 12 explains processing performed by the meta-analysis target literature identification unit 204 in the information processing apparatus 1b being an example of the second embodiment.

Examples illustrated in FIG. 12 correspond to the meta-analysis literatures A1 to A4 and the literatures B1 to B6 illustrated in FIG. 1.

FIG. 12 illustrates an example in which the meta-analysis target literature identification unit 204 identifies whether each cited literature is the meta-analysis target literature or the meta-analysis non-target literature by comparing the variation value of the class list calculated for the cited literature with a threshold of 0.7.

For example, the meta-analysis target literature identification unit 204 determines that the cited literature B2 having a variation value of 1.5 and the cited literature B4 having a variation value of 1.0 are the meta-analysis non-target literatures. The meta-analysis target literature identification unit 204 determines that the cited literatures B1, B3, B5, and B6 each having a variation value of 0.7 or less are the meta-analysis target literatures.

Results of the determination (list of meta-analysis target literatures/list of meta-analysis non-target literatures) by the meta-analysis target literature identification unit 204 are stored in a specific storage area such as the memory 12 or the storage device 13.

The clustering processing unit 201, the cited literature acquisition unit 202, the class list creation unit 203, and the meta-analysis target literature identification unit 204 described above function as the meta-analysis target literature determination unit that determines the meta-analysis target literature.

The training data generation unit 205 generates the training data to be used in creation of the machine learning model (classification model) for extraction of literatures cited in the meta-analysis literatures, by using the results of determination by the meta-analysis target literature identification unit 204.

For example, the training data generation unit 205 generates the training data by combining each of the cited literatures determined to be the meta-analysis target literature by the meta-analysis target literature identification unit 204, with information indicating that the cited literature is the meta-analysis target literature as correct data. The training data generation unit 205 generates the training data that includes a literature with a variation value equal to or lower than the threshold, for example, a literature for which the degree of similarity of the meta-analysis literatures is equal to or higher than the threshold, as the meta-analysis target literature.

The training data generated by the training data generation unit 205 is stored in a specific storage area such as the memory 12 or the storage device 13.

The training unit 206 executes training of the machine learning model for extraction of literatures cited in the meta-analysis literatures, by using the training data generated by the training data generation unit 205. The machine learning model determines whether a literature is the target of meta-analysis (meta-analysis target literature).

Information (for example, various parameters) on the machine learning model trained by the training unit 206 is stored in a specific storage area such as the memory 12 or the storage device 13.

(B) Operation

Figure 13:
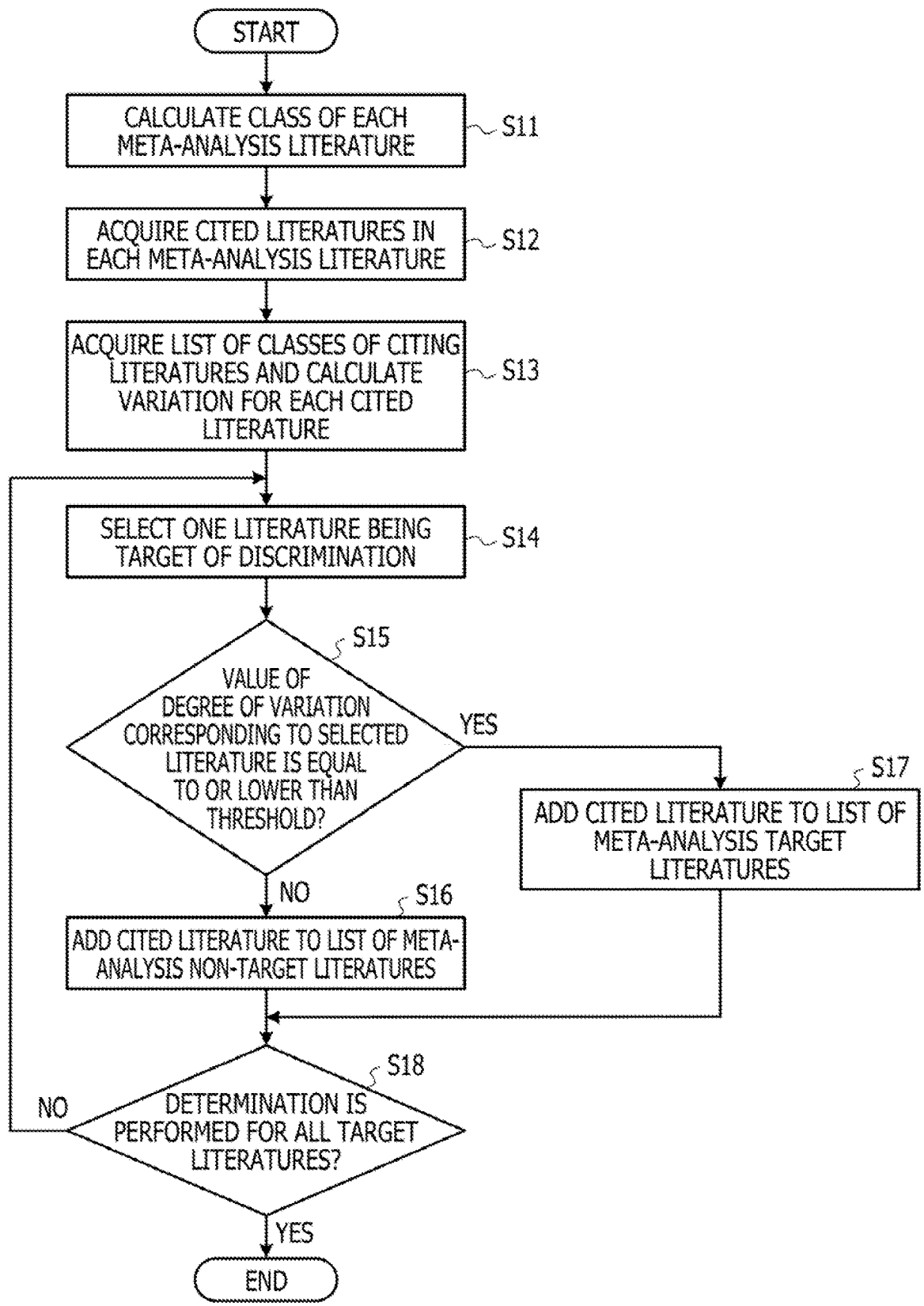
FIG. 13 is a flowchart for explaining a processing method of determining the meta-analysis target literature in the information processing apparatus being an example of the second embodiment.

A processing method of determining the meta-analysis target literature in the information processing apparatus 1b being an example of the second embodiment and configured as described above is described according to a flowchart (steps S11 to S18) illustrated in FIG. 13.

In step S11, the clustering processing unit 201 applies clustering to the plurality of meta-analysis literatures to acquire the class of each meta-analysis literature.

In step S12, the cited literature acquisition unit 202 acquires the cited literatures cited in each meta-analysis literature. All of the acquired cited literatures are treated as targets of discrimination of whether the literature is the meta-analysis target literature or not.

In step S13, the class list creation unit 203 creates the class list of classes corresponding to the citing meta-analysis literatures, for each of the cited literatures acquired by the cited literature acquisition unit 202. The class list creation unit 203 calculates variation in the class list for each cited literature.

In step S14, the meta-analysis target literature identification unit 204 selects one of the one or more cited literatures being the targets of discrimination.

In step S15, the meta-analysis target literature identification unit 204 compares the variation value corresponding to the selected cited literature with the threshold. When the variation value is equal to or lower than the threshold in the result of comparison (see YES route in step S15), the processing proceeds to step S17.

In step S17, the meta-analysis target literature identification unit 204 determines that the selected cited literature is the meta-analysis target literature, and registers the selected cited literature in the list of meta-analysis target literatures.

Meanwhile, when the variation value is higher than the threshold in the result of comparison in step S15 (see NO route in step S15), the processing proceeds to step S16.

In step S16, the meta-analysis target literature identification unit 204 determines that the selected cited literature is the meta-analysis non-target literature, and registers the selected cited literature in the list of meta-analysis non-target literatures.

Then, in step S18, the meta-analysis target literature identification unit 204 checks whether the processes of steps S15 to S17 is executed, for example, the discrimination of whether the cited literature is the meta-analysis target literature or not is performed for all cited literatures being the targets of discrimination.

When the discrimination (determination) is not performed for all cited literatures being the targets of discrimination in the result of the check (see NO route in step S18), the processing returns to step S14. In step S14, the cited literature not subjected to the discrimination of whether the cited literature is the meta-analysis target literature or not is selected from the cited literatures being the targets of discrimination.

Meanwhile, when the discrimination (determination) is performed for all cited literatures being the targets of discrimination (see YES route in step S18), the processing is terminated.

The training data generation unit 205 generates the training data by combining each of the cited literatures determined to be the meta-analysis target literature by the meta-analysis target literature identification unit 204, with information indicating that the cited literature is the meta-analysis target literature as correct data. The training unit 206 trains the machine learning model by using the generated training data.

(C) Effects

As described above, according to the information processing apparatus 1b being an example of the second embodiment, the clustering processing unit 201 applies clustering to each of the plurality of meta-analysis literatures to obtain the class of the meta-analysis literature. For each of the cited literatures cited in the meta-analysis literatures, the class list creation unit 203 creates the class list of classes corresponding to the citing meta-analysis literatures and then calculates the variation of the class list.

The meta-analysis target literature identification unit 204 compares the variation value calculated for each cited literature with the threshold, and determines that the cited literature is the meta-analysis target literature when the variation value is equal to or lower than the threshold. Meanwhile, the meta-analysis target literature identification unit 204 determines that the cited literature is the meta-analysis non-target literature when the variation value is higher than the threshold.

For example, the meta-analysis target literature and the meta-analysis non-target literature may be easily identified by comparing the variation value of the class list with the threshold. Consequently, the training data to be used in creation of the machine learning model (classification model) for extraction of literatures cited in the meta-analysis literatures may be easily generated.

The variation being large in this case may be considered that the variation in the themes of the citing meta-analysis literatures is large for the cited literature. The variation in the themes of the citing meta-analysis literatures being large for the cited literature means that the themes of the citing meta-analysis literatures vary widely and it may be considered that the cited literature is the meta-analysis non-target literature.

Meanwhile, the variation being small may be considered that the variation in the themes of the citing meta-analysis literatures is small for the cited literature. The variation in the themes of the citing meta-analysis literatures being small for the cited literature means that the themes of the citing meta-analysis literatures do not vary widely and it may be considered that the cited literature is the meta-analysis target literature.

As described above, the information processing apparatus 1b of the second embodiment may also accurately discriminate the meta-analysis non-target literatures and the meta-analysis target literatures from each other, and generate high-quality training data.

(IV) Others

Figure 14:
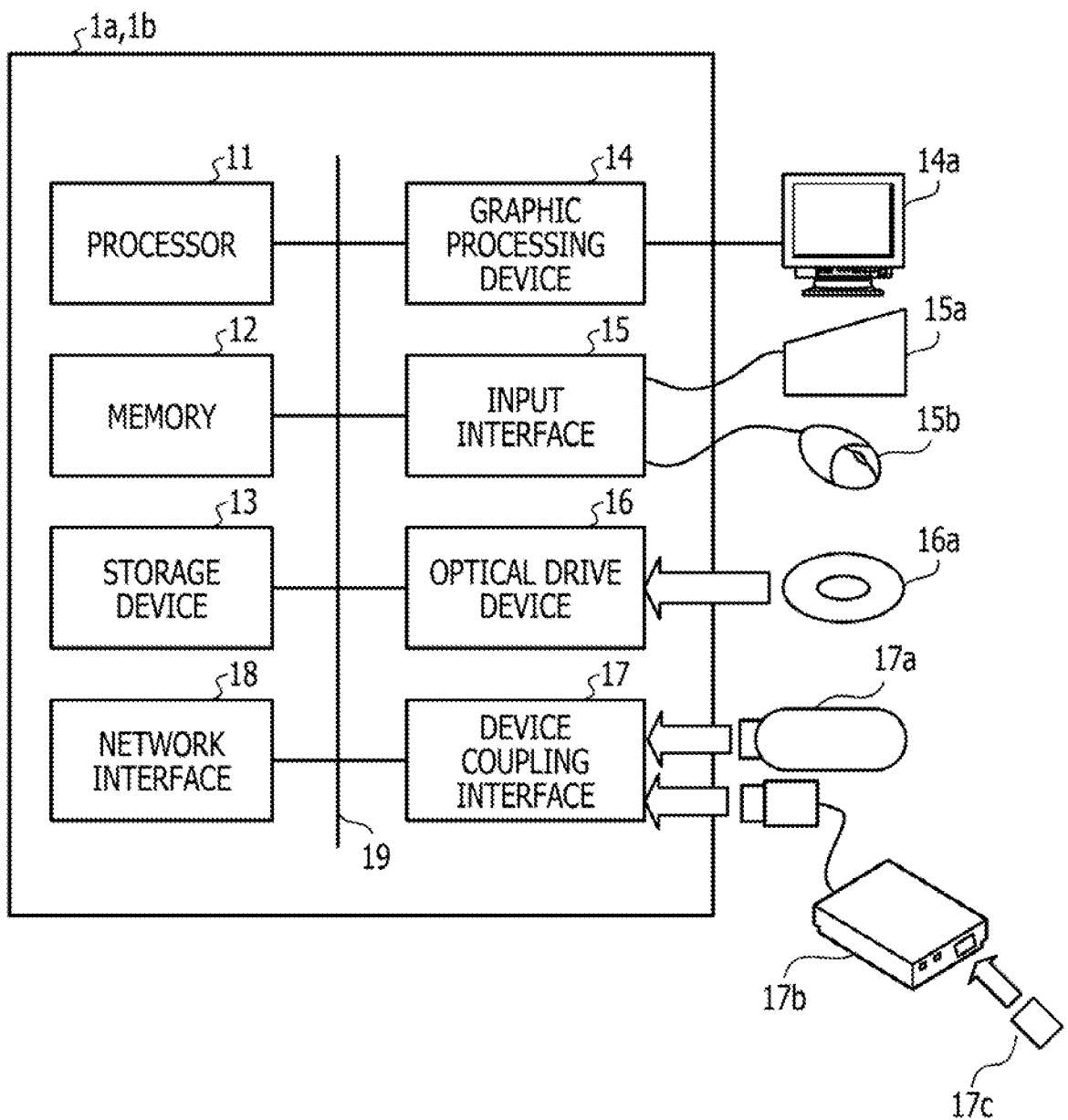
FIG. 14 illustrates a hardware configuration of the information processing apparatuses being examples of the first and second embodiments.

FIG. 14 illustrates a hardware configuration of the information processing apparatus 1a being an example of the first embodiment and the information processing apparatus 1b being an example of the second embodiment.

The information processing apparatuses 1a and 1b have the same hardware configuration. Each of the information processing apparatuses 1a and 1b is a computer and includes, for example, a processor 11, the memory 12, the storage device 13, a graphic processing device 14, an input interface 15, an optical drive device 16, a device coupling interface 17, and a network interface 18 as components. These components 11 to 18 are configured to be mutually communicable via a bus 19.

The processor 11 is a control unit that controls the entire information processing apparatus 1a, 1b. The processor 11 may be a multiprocessor. For example, the processor 11 may be any one of a central processing unit (CPU), a microprocessor unit (MPU), a digital signal processor (DSP), an application-specific integrated circuit (ASIC), a programmable logic device (PLD), and a field-programmable gate array (FPGA). The processor 11 may be a combination of two or more types of elements selected from the CPU, the MPU, the DSP, the ASIC, the PLD, and the FPGA.

The processor 11 executes a control program (training data generation program, not illustrated) for the information processing apparatus 1a to implement the functions as the literature vector calculation unit 101, the cited literature acquisition unit 102, the average distance calculation unit 103, the meta-analysis target literature identification unit 104, the training data generation unit 105, and the training unit 106 illustrated in FIG. 2.

The processor 11 executes a control program (training data generation program, not illustrated) for the information processing apparatus 1b to implement the functions as the clustering processing unit 201, the cited literature acquisition unit 202, the class list creation unit 203, the meta-analysis target literature identification unit 204, the training data generation unit 205, and the training unit 206 illustrated in FIG. 8.

The information processing apparatus 1a executes, for example, programs (training data generation program, OS program) recorded in a computer-readable non-transitory recording medium to implement the functions as the literature vector calculation unit 101, the cited literature acquisition unit 102, the average distance calculation unit 103, the meta-analysis target literature identification unit 104, the training data generation unit 105, and the training unit 106.

The information processing apparatus 1b executes, for example, programs (training data generation program, OS program) recorded in a computer-readable non-transitory recording medium to implement the functions as the clustering processing unit 201, the cited literature acquisition unit 202, the class list creation unit 203, the meta-analysis target literature identification unit 204, the training data generation unit 205, and the training unit 206.

The programs describing contents of processing to be executed by the information processing apparatus 1a, 1b may be recorded in various recording media. For example, the programs to be executed by the information processing apparatus 1a, 1b may be stored in the storage device 13. The processor 11 loads at least a subset of each program in the storage device 13 onto the memory 12 and executes the loaded program.

The programs to be executed by the information processing apparatus 1a, 1b (processor 11) may be recorded in non-transitory portable recording media such as an optical disc 16a, a memory device 17a, and a memory card 17c. For example, the programs stored in the portable recording media become executable after being installed in the storage device 13 by control from the processor 11. The processor 11 may execute the programs by reading the programs directly from the portable recording media.

The memory 12 is a storage memory including a read-only memory (ROM) and a random-access memory (RAM). The RAM of the memory 12 is used as a main storage device of the information processing apparatus 1a, 1b. The programs to be executed by the processor 11 are at least partially temporarily stored in the RAM. Various types of data desired for the processing by the processor 11 are stored in the memory 12.

The storage device 13 is a storage device such as a hard disk drive (HDD), a solid-state drive (SSD), or a storage class memory (SCM) and stores various types of data. The storage device 13 is used as an auxiliary storage device of the information processing apparatus 1a, 1b.

The OS program, the control program, and various types of data are stored in the storage device 13. The training data generation program is included in the control program.

A semiconductor storage device such as an SCM or a flash memory may be used as the auxiliary storage device. A plurality of storage devices 13 may be used to configure redundant arrays of inexpensive disks (RAID).

A monitor 14a is coupled to the graphic processing device 14. The graphic processing device 14 displays an image on a screen of the monitor 14a according to an instruction from the processor 11. Examples of the monitor 14a include a display device using a cathode ray tube (CRT), a liquid crystal display device, and the like.

A keyboard 15a and a mouse 15b are coupled to the input interface 15. The input interface 15 transmits signals received from the keyboard 15a and the mouse 15b to the processor 11. The mouse 15b is an example of a pointing device, and a different pointing device may be used. Examples of the different pointing device include a touch panel, a tablet, a touch pad, a track ball, and the like.

The optical drive device 16 reads data recorded in the optical disc 16a by using laser light or the like. The optical disc 16a is a portable non-transitory recording medium in which data is recorded in such a way that the data is readable by means of light reflection. Examples of the optical disc 16a include a Digital Versatile Disc (DVD), a DVD-RAM, a compact disc read-only memory (CD-ROM), a CD-recordable (R)/rewritable (RW), and the like.

The device coupling interface 17 is a communication interface for coupling a peripheral device to the information processing apparatus 1a, 1b. For example, the memory device 17a or a memory reader-writer 17b may be coupled to the device coupling interface 17. The memory device 17a is a non-transitory recording medium such as a Universal Serial Bus (USB) memory that has a function of communicating with the device coupling interface 17. The memory reader-writer 17b writes data to the memory card 17c or reads data from the memory card 17c. The memory card 17c is a card-type non-transitory recording medium.

The network interface 18 is coupled to a network. The network interface 18 exchanges data via the network. Other information processing apparatuses, communication devices, and the like may be coupled to the network.

The disclosed technique is not limited to the embodiments described above and may be carried out while being modified in various ways without departing from the gist of the present embodiments. The configurations and the processes of the present embodiments may be selectively employed or omitted as desired or may be combined as appropriate.

For example, although the clustering processing unit 201 sets the class of each meta-analysis literature by using the clustering method in the second embodiment described above, the embodiment is not limited thereto. For example, the class classification may be performed on each meta-analysis literature by using a known class classification method, and may be carried out with modifications as appropriate.

Although examples in which each of the cited literatures cited in the meta-analysis literatures is identified to be the meta-analysis target literature or the meta-analysis non-target literature are described in the aforementioned embodiments, the embodiments are not limited to these examples and may be applied to cited literature identification for literatures other than the meta-analysis literatures.

The above-described disclosure enables a person skilled in the art to carry out and manufacture the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a training data generation program for causing a computer to execute processing comprising:
    identifying, from among meta-analysis literatures stored in a memory, a plurality of meta-analysis literatures each of which cites a first literature;
    determining a degree of variation in themes among the plurality of identified meta-analysis literatures based on feature information of each of the plurality of identified meta-analysis literatures; and
    in a case where the degree of variation is less than a threshold, generating training data for machine learning by using the first literature.

2. The recording medium according to claim 1, wherein the feature information includes document vectors each of which is calculated based on each meta-analysis literature of the plurality of meta-analysis literatures, and the degree of variation is calculated based on distances between a center of gravity of the document vectors and the document vectors.

3. The recording medium according to claim 1, wherein the feature information is classes generated by performing clustering on the plurality of meta-analysis literatures, and the degree of variation is calculated based on a variation in the generated classes.

4. A computer-implemented training data generation method comprising:
 identifying, from among meta-analysis literatures stored in a memory, a plurality of meta-analysis literatures each of which cites a first literature;
 determining a degree of variation in themes among the plurality of identified meta-analysis literatures based on feature information of each of the plurality of identified meta-analysis literatures; and
 in a case where the degree of variation is less than a threshold, generating training data for machine learning by using the first literature.

5. A training data generation apparatus comprising:
 a memory; and
 a processor coupled to the memory, the processor being configured to perform processing, the processing including:
 identifying, from among meta-analysis literatures stored in the memory, a plurality of meta-analysis literatures each of which cites a first literature;
 determining a degree of variation in themes among the plurality of identified meta-analysis literatures based on feature information of each of the plurality of identified meta-analysis literatures; and
 in a case where the degree of variation is less than a threshold, generating training data for machine learning by using the first literature.

* * * * *